(12) United States Patent
Burnett

(10) Patent No.: US 7,816,836 B2
(45) Date of Patent: Oct. 19, 2010

(54) REDUCED STRESS GENERATOR POLE TIP FILLET

(75) Inventor: Dwayne E Burnett, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/362,718

(22) Filed: Jan. 30, 2009

(65) Prior Publication Data

US 2010/0194234 A1 Aug. 5, 2010

(51) Int. Cl.
*H02K 1/24* (2006.01)
*H02K 1/06* (2006.01)
*H02K 1/00* (2006.01)
*H02K 41/02* (2006.01)

(52) U.S. Cl. .................. 310/269; 310/216.072; 310/216.073; 310/216.074; 310/187; 310/12.24

(58) Field of Classification Search .................. 310/216.072–216.074, 269, 12.24, 49.44, 310/49.34, 154.24, 154.29, 154.38–154.39, 310/187, 154.46

See application file for complete search history.

(56) References Cited

U.S. PATENT DOCUMENTS

| 4,812,695 | A | * | 3/1989 | Parshall | 310/410 |
| 6,124,661 | A | | 9/2000 | Gardner | |
| 6,774,522 | B2 | | 8/2004 | Aoyama et al. | |
| 6,933,648 | B2 | * | 8/2005 | Buchan et al. | 310/214 |
| 7,122,931 | B2 | | 10/2006 | Zhang et al. | |

FOREIGN PATENT DOCUMENTS

DE 3244326 C * 5/1984
JP 10164787 A * 6/1998

OTHER PUBLICATIONS

Machine Translation JP10164787 (1998) and DE3244326 (1984).*

* cited by examiner

*Primary Examiner*—Quyen Leung
*Assistant Examiner*—Jose A Gonzalez Quinones
(74) *Attorney, Agent, or Firm*—Oral Caglar, Esq.

(57) ABSTRACT

A reduced stress rotor tip fillet that may be utilized in generators and motors as well as other types of rotating equipment is disclosed herein. The rotor tip fillet may reduce stress via an inventive fillet configuration positioned between intersecting rotor faces.

20 Claims, 4 Drawing Sheets

REDUCED STRESS GENERATOR POLE TIP FILLET

BACKGROUND OF THE INVENTION

The present invention generally relates to rotating equipment such as electric motors and generators, and more particularly, to an electric generator rotor and to a rotor feature that may minimize stress in the rotor and may reduce maintenance and repairs to the rotor.

An electric generator may have a rotor rotating within a magnetic field and having poles carrying coil windings. The coil windings may generate electric current as they move through the magnetic field.

The coil windings wrap around rotor poles extending radially from a central rotor shaft. Rotor rotation creates a radially-outward force that biases the coil windings to move away from the central shaft. To keep the coil windings in place during rotation, the poles have overhangs extending perpendicularly outward from the poles and distal the central shaft. The overhangs block the coil windings from slipping outward off of the poles while the rotor rotates.

Poles may experience high stresses at an interior corner where the overhang extends out from the pole. The high stresses may be caused by a combination of the radially-outward force on the coil winding and bending caused by the radially outward force on the overhang.

As may be seen in the prior art, there have been attempts to address high stress in rotors. In one example, an oversized conventional fillet is added only to certain regions where high stress is expected. A conventional fillet eliminates the interior sharp corner that results from the intersection of two planar faces by adding material to the corner in the shape of a concave curvilinear profile that intersects tangentially with both faces. The fillet eliminates the sharp corner that acts as a stress concentration but also blocks access to the corner so that any mating parts may be offset from both the planar faces. It is well known in the art to utilize a larger conventional fillet to reduce stress concentrations.

In another example, a configuration used in current rotor pole production and as a method of repairing cracks at the junction between the overhang and the pole comprises removing material around the crack to create an oversized stress-relief fillet. The fillet in this example does not intersect either of the surfaces tangentially.

In both of the abovementioned examples, a fillet with a large radius is utilized to maintain reasonable pole fillet stress levels.

As is seen, there is a need for an improved stress-reducing fillet for generator rotors.

SUMMARY OF THE INVENTION

In one aspect of the present invention, a reduced stress rotor comprises a shaft with a shaft axis, and a pole extending radially outward from the shaft; the pole having a pole face and an overhang face; the pole face intersecting with the overhang face; the pole face comprising a planar surface that is distal the overhang face, and a curvilinear concave surface that is proximal the overhang face; the curvilinear concave surface intersecting tangentially with the overhang face; the pole face further comprising a curvilinear convex surface that is medial the planar surface and the curvilinear concave surface; the curvilinear convex surface intersecting tangentially with the curvilinear concave surface, and the curvilinear convex surface blending shapewise-smoothly into the planar face over a transition distance.

In another aspect of the present invention, a reduced stress rotor comprises a shaft with a shaft axis and a pole extending radially outward from the shaft; the pole has a pole face and an overhang face; the pole face intersecting with the overhang face at a core winding seat; the pole face comprising a planar surface that is distal the overhang face and a curvilinear concave surface that is proximal the overhang face; the concave surface extending into the pole from the planar surface, and the concave surface intersecting tangentially with the overhang face and extending into the pole from the planer surface so that a core winding assembly abutting at least part of the pole face may contact the overhang face at the core winding seat; the pole face further comprising a curvilinear convex surface extending over a transition distance between the concave surface and the planar surface; the convex surface blending shapewise-smoothly into the concave surface and into the planar surface.

In another aspect of the present invention, a stress reducing fillet that joins two planar faces of a rotor comprises a curvilinear surface proximal an intersection of a first planar face and a second planar face; the curvilinear surface extending into the rotor away from the second planar face to expose the first planar face at the intersection; the curvilinear surface comprising a concave portion that intersects tangentially with the first planar face and a convex portion that blends shapewise-smoothly with the concave portion; the convex portion blending shapewise-smoothly with the second planar face over a transition distance.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that may each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention generally provide a reduced stress rotor that may be utilized in generators and motors as well as other types of rotating equipment. Embodiments of the invention may reduce stress via a fillet configuration positioned between intersecting rotor faces.

Embodiments of the invention may be used in place of a conventional fillet to reduce undesirable gaps between components Embodiments of the invention include a fillet configuration with a concave surface that intersects tangentially with one of two intersecting rotor faces. By tangentially intersecting with the face, the embodiments of the invention may preclude introducing sharp edges in the area of the coil winding and may minimize stress concentration. The fillet may extend into the pole away from the intersection of the faces so that a coil winding may abut the intersecting rotor faces. The fillet may blend smoothly with the remaining intersecting face to reduce sharp edges and to minimize stress concentration.

Figure 1:
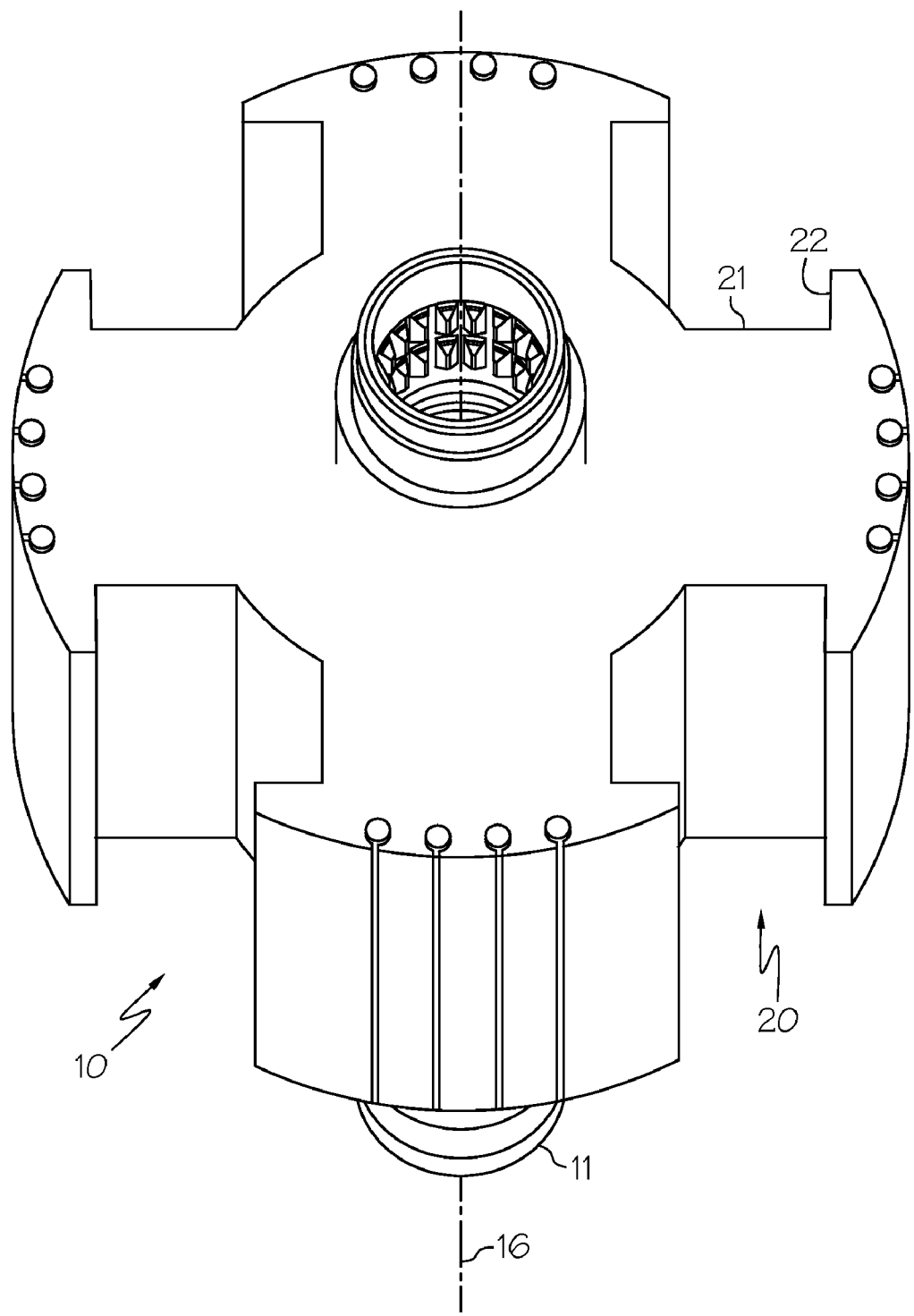
FIG. 1 is an isometric view of an embodiment of a generator rotor according to one embodiment of the present invention.

As seen in the exemplary embodiment of FIG. 1, the rotor 10 may have a shaft 11. The rotor in use may rotate about a shaft axis 16. The rotor 10 may have at least one pole, for example the pole 20, extending substantially radially outward from the shaft 11. The pole 20 may have a substantially planar pole face 21 extending substantially parallel to the shaft axis 16 along the pole 20 proximal the shaft 11, and a substantially planar overhang face 22 extending substantially parallel to the shaft axis 16 along the pole 20 distal the shaft 11. The overhang face 22 may be positioned at an angle with respect to the pole face 21.

Figure 2:
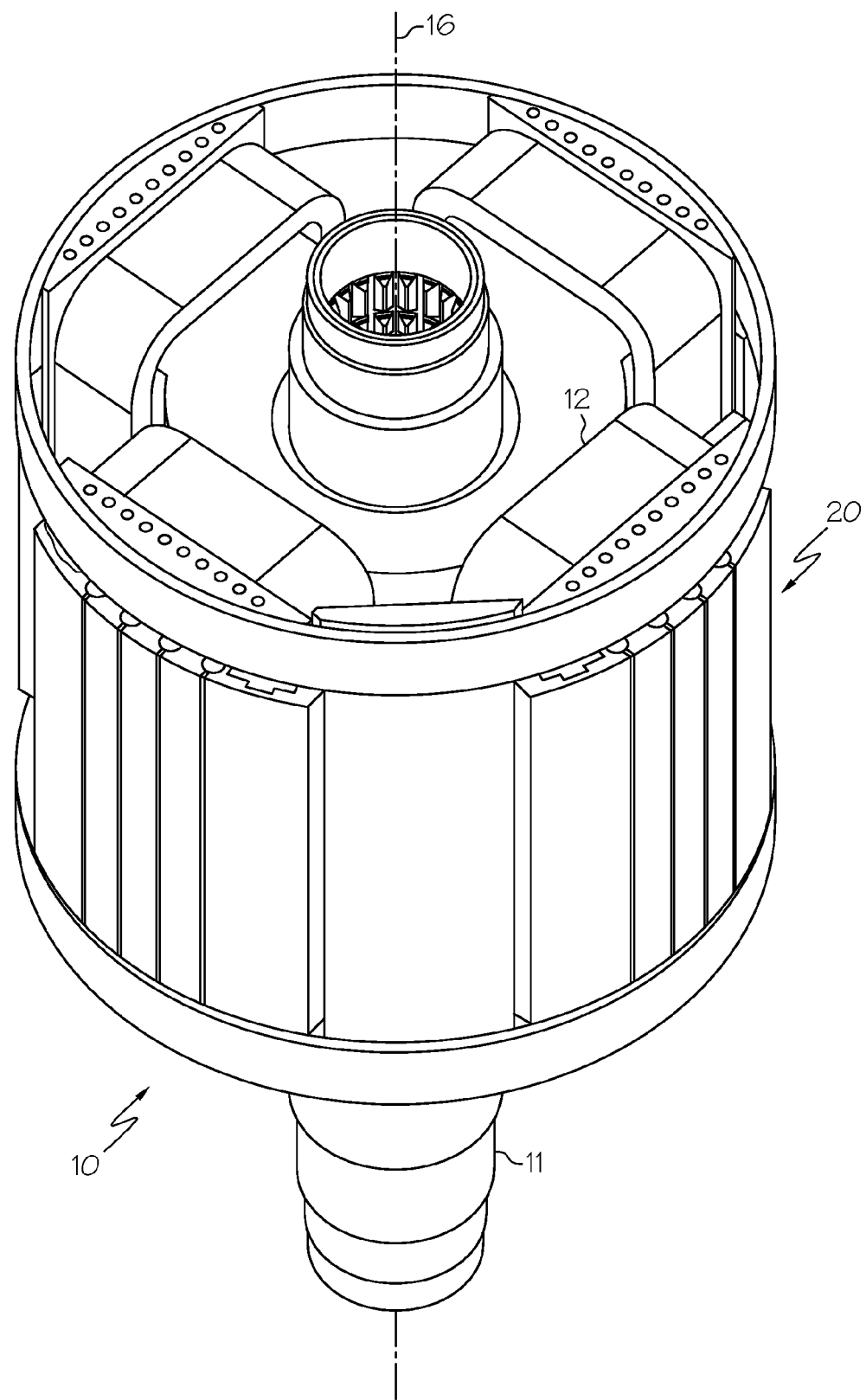
FIG. 2 is an isometric view of an embodiment of the generator rotor of FIG. 1 with coil windings in place on the rotor poles.
Figure 3:
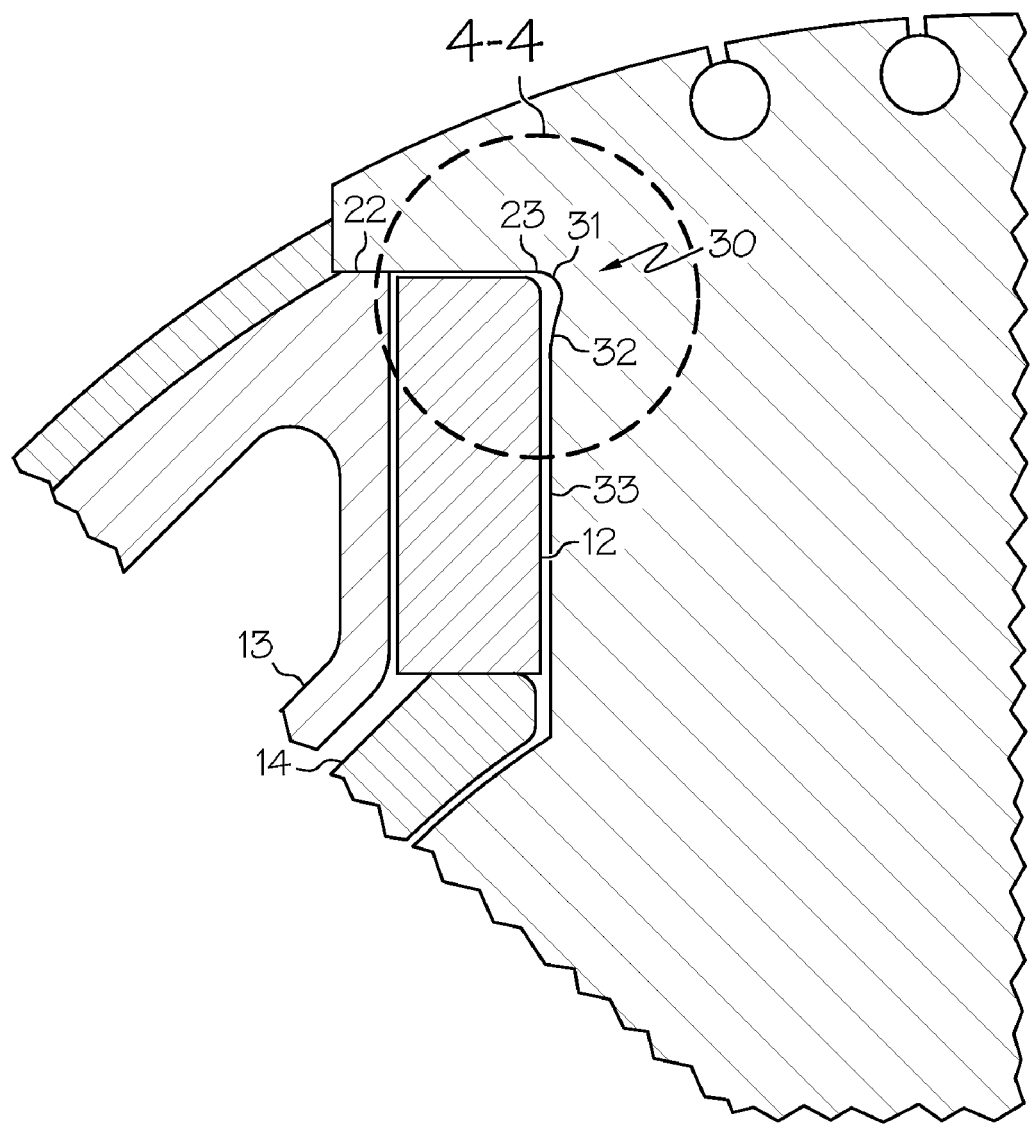
FIG. 3 is an end section view of an embodiment of a generator rotor according to one embodiment of the present invention.

As seen in the exemplary embodiment of FIG. 2 and FIG. 3, a coil winding 12 may wrap around the pole 20. The coil winding 12 may extend from proximal the shaft 11 up to the overhang face 22. As the rotor 10 rotates about the shaft axis 16, the coil winding 12 may exert a radially outward force on the overhang face 22, causing high stress at an interior corner where the overhang face 22 and the pole face 21 intersect. The coil winding 20 may be positioned between a base wedge 14 and the overhang face 22, and may be positioned against the pole face 21 by a wedge 13.

Figure 4:
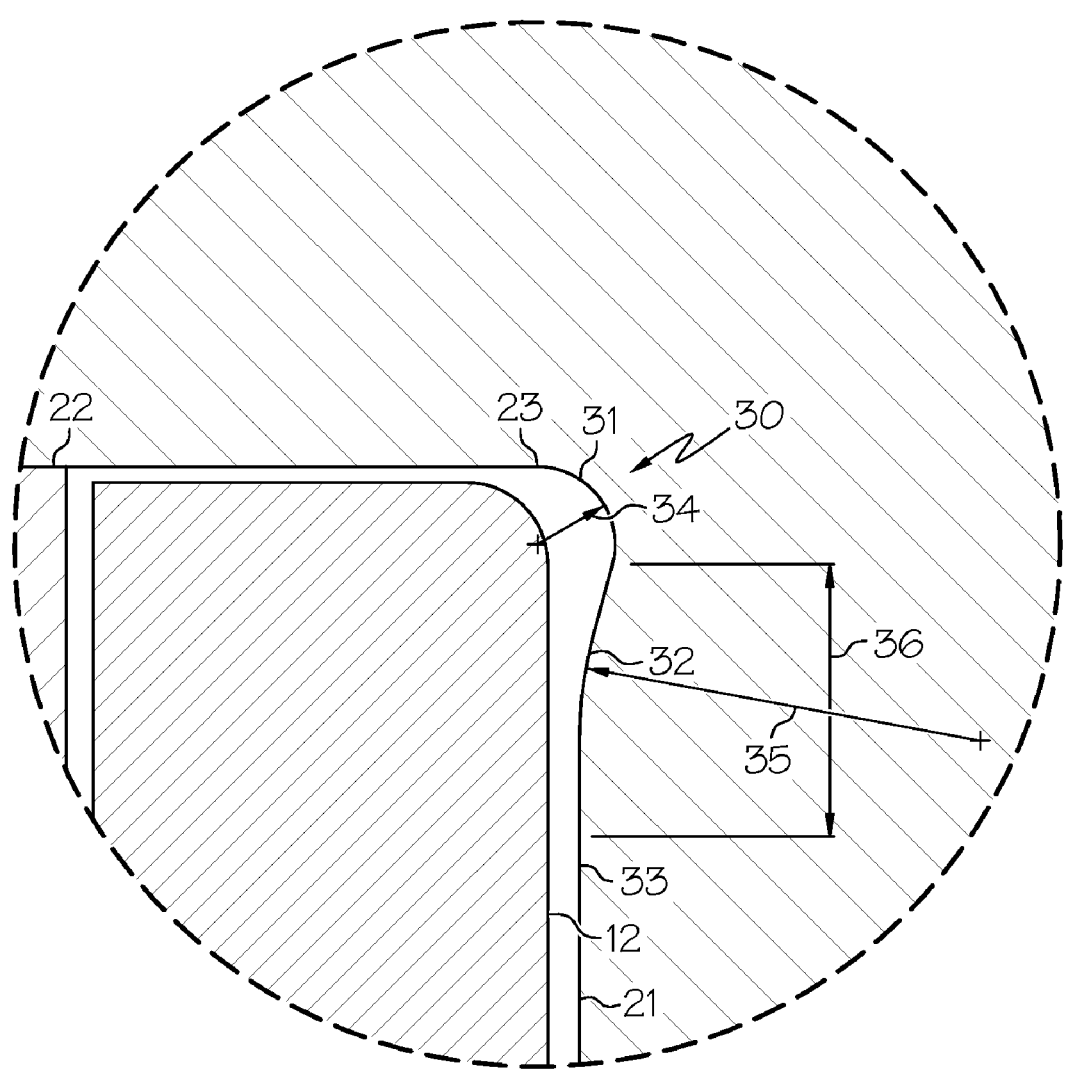
FIG. 4 is a detail view taken from within line 4-4 of FIG. 3.

As seen in the exemplary embodiment of FIG. 3, and in the detail view FIG. 4, the rotor 10 may have a fillet 30 positioned proximal the coil winding seat 23.

The fillet 30 may comprise a curvilinear concave surface 31 that intersects tangentially with the overhang face 22 at a coil winding seat 23 and may extend into the pole away from the pole face 21. The concave surface 31 may curve towards the shaft 11 and away from the overhang face 22 so that the coil winding seat 23 is exposed to enable a coil winding 20 to abut both the overhang face 22 and a planar surface 33 of the pole face 21.

The fillet 30 may comprise a curvilinear convex surface 32 medial the concave surface 31 and the planar surface 33. The convex surface 32 may connect the concave surface 31 and the planar surface 33.

The concave surface 31 may have a substantially constant concave radius of curvature 34. Alternatively, the concave surface 31 may have complex geometry so long as the concave surface 31 intersects the overhang face 22 tangentially.

The convex surface 32 may have a substantially constant convex radius of curvature 35. The convex radius of curvature 35 may be larger than the concave radius of curvature 34. For example, the convex radius of curvature 35 may range from three to fifteen times as large as the concave radius of curvature 34. The convex surface 32 may intersect the concave surface 31 tangentially. Alternatively, the convex surface 32 may blend shapewise-smoothly with the concave surface 31 so that there is no sharp edge where the concave surface 31 intersects the convex surface 32.

As seen in FIG. 4, the convex surface 32 may extend from the concave surface 31 to the planar surface 33 over a transition distance 36. The transition distance 36 may vary in size and may correspond in part to the convex radius of curvature 35. For example, a very large convex radius of curvature 35 may extend over a large transition distance 36 in order to blend shapewise-smoothly with the planar surface 33. The transition distance 36 may be predetermined and the convex radius of curvature 35 developed to accommodate the predetermined transition distance 36. Alternatively, the convex radius of curvature 35 may be predetermined and then the transition distance 36 developed to accommodate the predetermined convex radius of curvature 35. In some cases, the transition distance 36 may depend on other variables, for example when the convex surface 35 has complex geometry.

In the exemplary embodiment of FIG. 3 and FIG. 4, the transition distance 36 may be more than twice as large as the concave radius of curvature. The convex surface 32 may have a substantially constant convex radius of curvature 35 that is larger than the concave radius of curvature 34. This configuration has been found by experiment to produce acceptable stress levels.

It should be understood, of course, that the foregoing relates to exemplary embodiments of the invention and that modifications may be made without departing from the spirit and scope of the invention as set forth in the following claims.

I claim:

1. A reduced stress rotor, the rotor comprising:
  a shaft with a shaft axis;
  a pole extending radially outward from the shaft;
  a coil winding positioned on the pole;
  the pole having a planar pole face and a planar overhang face, the planar pole face oriented orthogonally with the planar overhang face, the planar overhang face oriented orthogonally with a radially outward force exerted by the coil winding, the coil winding oriented orthogonally against the planar overhang face by the radially outward force; and
  an intersection region between planes of the planar pole face and the planar overhang face comprising:
    a planar surface being distal the overhang face;
    a curvilinear space extending into the pole beyond the planar pole face;
    the curvilinear space having a surface intersecting tangentially with the planar overhang face and continuously and tangentially with the planar pole face, tangents taken at respective points of intersection being perpendicular to each other;
  wherein the coil winding directly abuts both the planar pole face and the planar overhang face.

2. The rotor of claim 1 wherein the curvilinear space comprises a curvilinear concave surface with a constant concave radius of curvature.

3. The rotor of claim 2 wherein the curvilinear space comprises a curvilinear convex surface with a constant convex radius of curvature.

4. The rotor of claim 3 wherein the curvilinear convex surface has a constant convex radius of curvature larger than the concave radius of curvature of the curvilinear concave surface.

5. The rotor of claim 4 wherein the convex radius of curvature is at least three times as large as the concave radius of curvature.

6. The rotor of claim 4 where the curvilinear convex surface intersects tangentially with the planar pole face.

7. The rotor of claim 4 where a transition distance between the concave surface and the convex surface is at least twice as large as the concave radius of curvature.

8. A reduced stress rotor, the rotor comprising:
a shaft with a shaft axis;
a pole extending radially outward from the shaft;
the pole having an pole face and an overhang face;
the pole face intersecting with the overhang face at a coil winding seat;
a concave surface extending into the pole from a planar surface of the pole face; the concave surface intersecting tangentially with the overhang face at an overhang intersection point and extending into the pole from the planer surface so that a coil winding assembly contacts both the pole face and the overhang face at the coil winding seat;
a curvilinear convex surface extending over a transition distance between the concave surface and the planar surface of the pole face; and
the convex surface blending into the concave surface and into the planar surface of the pole face at a pole intersection point;
wherein tangents taken at the overhang and pole intersection points are perpendicular with each other.

9. The rotor of claim 8 wherein the concave surface has a constant concave radius of curvature.

10. The rotor of claim 8 wherein the curvilinear convex surface has a constant convex radius of curvature.

11. The rotor of claim 8 wherein the curvilinear convex surface has a constant convex radius of curvature and wherein the convex radius of curvature is larger than a concave radius of curvature of the concave surface.

12. The rotor of claim 11 wherein the convex radius of curvature is at least three times as large as the concave radius of curvature.

13. The rotor of claim 8 where the curvilinear convex surface intersects tangentially with the planar surface of the pole face.

14. A stress reducing fillet joining two planar faces of a rotor, the fillet comprising:

a curvilinear surface proximal a projected intersection of a first planar face and a second planar face at a coil winding seat;
the curvilinear surface extending into the rotor so that the coil winding seat provides two orthogonally-oriented planar surfaces against which a coil winding can directly abut;
the curvilinear surface comprising:
a concave portion that intersects tangentially and continuously with the first planar face at an intersection point between the concave portion and the first planar face;
a convex portion that blends shapewise-smoothly with the concave portion; and
the convex portion blending continuously with the second planar face over a transition distance at an intersection point between the convex portion and the convex portion;
wherein tangents taken at the intersection points are orthogonal with each other.

15. The fillet of claim 14 wherein the concave portion has a constant concave radius of curvature.

16. The fillet of claim 14 wherein the convex portion has a constant convex radius of curvature.

17. The fillet of claim 14 wherein the transition distance is predetermined and wherein the convex radius of curvature is developed to accommodate the transition distance.

18. The fillet of claim 14 wherein the convex radius of curvature is predetermined and wherein the transition distance is developed to accommodate the convex radius of curvature.

19. The fillet of claim 14 where the convex surface intersects tangentially with the second planar face.

20. The fillet of claim 14 where the transition distance is at least twice as large as the concave radius of curvature.

* * * * *